(12) United States Patent
Baehr-Jones et al.

(10) Patent No.: US 8,098,965 B1
(45) Date of Patent: Jan. 17, 2012

(54) ELECTROABSORPTION MODULATOR BASED ON FERMI LEVEL TUNING

(75) Inventors: Tom Baehr-Jones, Seattle, WA (US); Michael J. Hochberg, Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 12/630,829

(22) Filed: Dec. 3, 2009

Related U.S. Application Data

(63) Continuation of application No. 12/510,544, filed on Jul. 28, 2009, now abandoned, and a continuation-in-part of application No. PCT/US2009/033516, filed on Feb. 9, 2009.

(60) Provisional application No. 61/084,459, filed on Jul. 29, 2008, provisional application No. 61/027,022, filed on Feb. 7, 2008.

(51) Int. Cl.
*G02F 1/035* (2006.01)
*G02B 6/26* (2006.01)
*G02B 6/42* (2006.01)

(52) U.S. Cl. ............. 385/2; 385/1; 385/3; 385/5; 385/8; 385/15; 385/39; 385/40; 385/41; 385/42; 385/129; 385/130; 385/132

(58) Field of Classification Search ................ 385/2, 40, 385/41, 132
See application file for complete search history.

(56) References Cited

U.S. PATENT DOCUMENTS 6,100,543 A * 8/2000 Sakata ............................ 257/21

* cited by examiner

*Primary Examiner* — Ryan Lepisto
(74) *Attorney, Agent, or Firm* — Milstein Zhang & Wu LLC; Joseph B. Milstein

(57) ABSTRACT

A novel electroabsorption modulator based on tuning the Fermi level relative to mid-gap states in a semiconductor. The modulator includes a semiconductor waveguide that has an input port and an output port. Between the input port and the output port is a section of the waveguide that functions as an electroabsorptive region. Adjacent to the electroabsorptive region are electrical contacts. In operation by adjusting voltages on the electrical contacts, the quasi-Fermi level in the electroabsorptive region of the semiconductor waveguide is brought above or below mid band-gap electronic states. As these states transition between occupancy and vacancy, the absorption coefficient for optical radiation in the electroabsorptive region of the semiconductor changes. As this change in absorption coefficient modulates the intensity of transmitted radiation in response to an input data stream driving the voltages, the device functions as a semiconductor optical modulator in accordance with the principles of the invention.

23 Claims, 13 Drawing Sheets

PRIOR ART

FIG. 13A
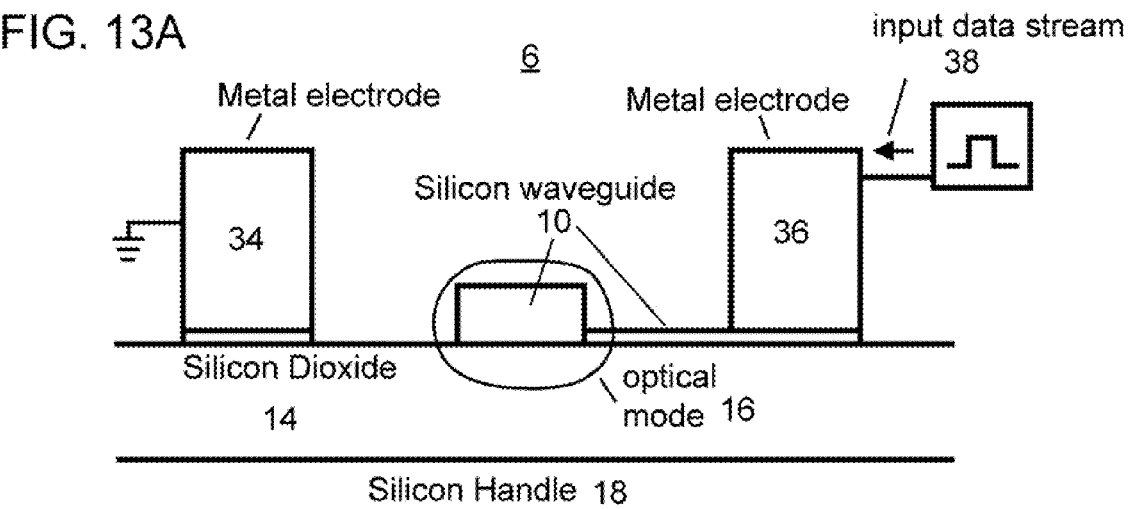
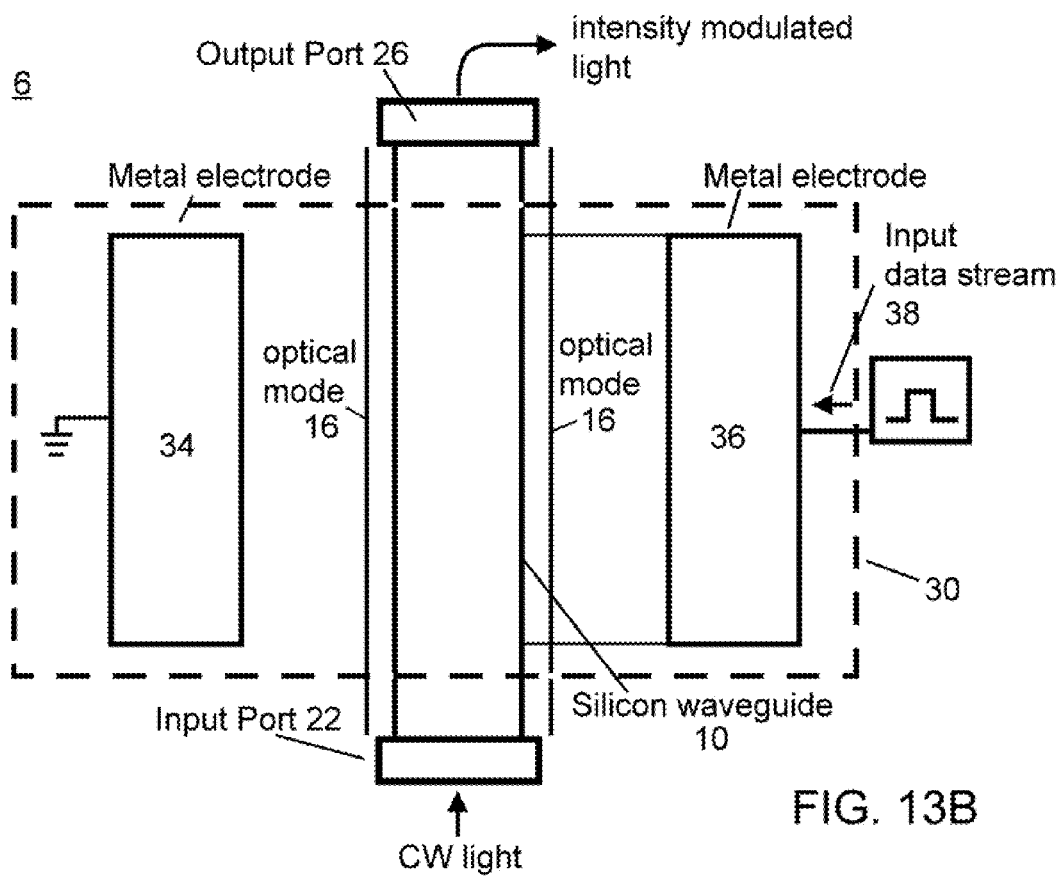
FIG. 13B

ELECTROABSORPTION MODULATOR BASED ON FERMI LEVEL TUNING

CROSS-REFERENCE TO RELATED APPLICATIONS

This application is a continuation of co-pending U.S. utility patent application Ser. No. 12/510,544, filed on Jul. 28, 2009, and this application claims priority to and the benefit of the earliest effective filing date of that co-pending application, which co-pending U.S. utility patent application Ser. No. 12/510,544 in turn claims priority to and the benefit of U.S. provisional patent application Ser. No. 61/084,459, filed Jul. 29, 2008, and U.S. utility patent application Ser. No. 12/510,544 is a continuation-in-part of co-pending International Application PCT/US09/33516, filed Monday Feb. 9, 2009, which designated the United States, and which itself claimed priority to and the benefit of then co-pending U.S. provisional patent application Ser. No. 61/027,022, filed Feb. 7, 2008, each of which applications is incorporated herein by reference in its entirety.

STATEMENT REGARDING FEDERALLY FUNDED RESEARCH OR DEVELOPMENT

NOT APPLICABLE.

THE NAMES OF THE PARTIES TO A JOINT RESEARCH AGREEMENT

NOT APPLICABLE.

BACKGROUND OF THE INVENTION

1. Field of the Invention

The invention relates to optical modulators in general and particularly to an electroabsorption modulator that employs Fermi level tuning.

2. Description of Related Art

Modulators are essential components of optical systems, enabling the conversion of a radio frequency signal into an intensity modulation on an optical signal. This can be used to encode a digital signal as a series of intensity pulses. In communications systems, the optical signals used are typically near 1550 nm in free space wavelength, but other wavelengths are possible. For example, commercial fiber optic-based telecommunication systems use signals in the vicinity of 1310 nm, 1490 nm and 1550 nm. In coarse wavelength division multiplexing (CWDM), a channel spacing grid using the wavelengths from 1270 nm through 1610 nm (revised to 1271 nm to 1611 nm) as center wavelengths with a channel spacing of 20 nm is an agreed ITU standard. Dense wavelength division multiplexing (DWDM) is another system used for standardized optical fiber-based telecommunication. In standard commercial systems, optical signals are converted to electrical signals for modulation, and are then converted back to optical signals for transmission.

One approach to building a modulator is to utilize a material that changes its absorption coefficient for optical radiation in response to an applied voltage. A typical means of achieving this is the Franz-Keldysh effect, which has recently been used with Ge—Si to build integrated electroabsorption modulators in a silicon platform.

There is a need for optical modulators that can modulate optical waves at extremely high speed, with low consumption of energy, and without requiring conversion of optical signals to electrical signals for modulation.

SUMMARY OF THE INVENTION

In one aspect the invention relates to a semiconductor electroabsorption modulator. The semiconductor electroabsorption modulator comprises a semiconductor wave guide having an input port configured to receive an input optical signal comprising a wavelength and an output port configured to transmit an output optical signal, the semiconductor wave guide having an electronic bandgap and an absorption coefficient for the wavelength, at least a portion of the semiconductor optical waveguide having at least one deliberately created electronic energy state within the electronic bandgap; and at least one pair of electrodes disposed in proximity to at least a portion of the semiconductor wave guide, at least one electrode of the at least one pair of electrodes configured to receive an input data signal. In response to an application of the input data signal to the at least one electrode of the at least one pair of electrodes, the output optical signal comprises a modulation component based upon a change in the absorption coefficient of at least a portion of the semiconductor wave guide, the modulation component configured to distinguish a one from a zero in a digital data stream.

In one embodiment, the at least one deliberately created electronic energy state within the electronic bandgap is due to surface states of the semiconducting wave guide. In one embodiment, the at least one deliberately created electronic energy state within the electronic bandgap is due to ion implantation in the semiconductor wave guide. In one embodiment, the semiconductor wave guide is implemented in damaged silicon. In one embodiment, the semiconductor wave guide is implemented in a silicon-on-insulator configuration. In one embodiment, the semiconductor wave guide is implemented in a III-V compound semiconductor. In one embodiment, the semiconductor wave guide is implemented in an amorphous semiconductor. In one embodiment, the at least one electrode includes at least a top electrode disposed above the semiconductor waveguide, the top electrode separated from the semiconductor waveguide by an insulating layer. In one embodiment, a wavelength of the output optical signal is a wavelength used in telecommunication. In one embodiment, the wavelength used in telecommunication is a wavelength in a selected one of a 1310 nm band, a 1490 nm band, and a 1550 nm band. In one embodiment, the wavelength is a wavelength in the range of 1 μm to 30 μm. In one embodiment, the change in the absorption coefficient of at least a portion of the semiconductor wave guide is responsive to a change in a Fermi level of the semiconductor wave guide, whereby a probability of occupancy of the at least one deliberately created electronic energy state within the electronic bandgap is modified.

In another aspect the invention features a method of operating a semiconducting electroabsorption modulator. The method comprises the steps of providing an input optical signal to an input port of a semiconductor wave guide, the semiconductor wave guide having at least one deliberately created electronic energy state in an electronic bandgap and having an optical output port configured to provide an output optical signal; changing a voltage on an electrode disposed in proximity to the semiconductor wave guide in response to an input data signal, the changing a voltage changing an absorption coefficient of the semiconductor wave guide by changing a probability of occupancy of the at least one deliberately created electronic energy state in the electronic bandgap; and transmitting the output optical signal from the optical output port, the output optical signal modulated in response to the input data signal.

In yet another aspect the invention features a semiconductor electroabsorption modulator. The semiconductor electroabsorption modulator comprises a semiconductor wave guide having an input port configured to receive an input optical signal comprising a wavelength and an output port configured to transmit an output optical signal, the semiconductor wave guide having an electronic bandgap separating a valence band and a conduction band and having an absorption coefficient for the wavelength, at least a portion of the semiconductor optical waveguide having deliberately created electronic energy states within the electronic bandgap, the deliberately created electronic energy states being separated from the valence band and from the conduction band; at least one electrode disposed in proximity to at least a portion of the semiconductor wave guide, the at least one electrode configured to receive an input data signal, wherein changing a voltage on the at least one electrode in response to the input data signal changes a probability of occupancy of the deliberately created electronic energy states within the electronic bandgap resulting in a change in the absorption coefficient for at least a portion of the semiconductor wave guide and a modulation of the output optical signal in response to the input data signal, the modulation configured to distinguish a one from a zero in a stream of digital data.

In one embodiment, the deliberately created electronic energy states within the electronic bandgap are due to surface states of the semiconducting wave guide. In one embodiment the deliberately created electronic energy states within the electronic bandgap are due to ion implantation in the semiconductor wave guide. In one embodiment, the semiconductor wave guide is implemented in damaged silicon. In one embodiment, the semiconductor wave guide is implemented in a silicon-on-insulator configuration. In one embodiment, the semiconductor wave guide is implemented in a III-V compound semiconductor. In one embodiment, the semiconductor wave guide is implemented in an amorphous semiconductor. In one embodiment, the at least one electrode includes at least a top electrode disposed above the semiconductor waveguide, the top electrode separated from the semiconductor waveguide by an insulating layer. In one embodiment, the wavelength is a wavelength used in telecommunication. In one embodiment, the wavelength used in telecommunication is a wavelength in a selected one of a 1310 nm band, a 1490 nm band, and a 1550 nm band. In one embodiment, the wavelength is a wavelength in the range of 1 µm to 30 µm. In one embodiment, the change in the absorption coefficient of at least a portion of the semiconductor wave guide is responsive to a change in a Fermi level of the semiconductor wave guide, whereby a probability of occupancy of the at least one deliberately created electronic energy state within the electronic bandgap is modified.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 13A and FIG. 13B show, respectively, a cross-sectional view and a top view of one embodiment of a semiconducting waveguide electroabsorption modulator, according to principles of the invention.

DETAILED DESCRIPTION OF THE INVENTION

Because silicon has an electronic bandgap of that falls between 1.11 eV and 1.12 eV, it is an ideal material platform for near-infrared integrated optical circuits. Electrically driven modulation and an optically pumped silicon laser have been previously demonstrated. For all-optical signal processing applications, low-power all-optical modulation is very useful and would represent an appreciable advance. Applications that are contemplated include optical buffering, all-optical wavelength conversion, and all-optical computation.

Silicon is an extremely attractive material platform for integrated optics at telecommunications wavelengths, particularly for integration with CMOS circuits. Developing detectors and electrically pumped lasers at telecom wavelengths are the two main technological hurdles before silicon can become a comprehensive platform for integrated optics. We describe a photocurrent in unimplanted SOI ridge waveguides. It is believed that the photocurrent is a consequence of surface state absorption. By electrically contacting the waveguides, a photodetector with a responsivity of 36 mA/W and quantum efficiency of 2.8% is demonstrated. The response is shown to have minimal falloff at speeds of up to 60 MHz.

Silicon is also a useful material because of its low cost as compared to many other semiconductors, and because it has a very well developed and well understood processing technology. Nevertheless, other semiconductor materials might in principle be used instead of silicon in a single-photon absorption device. For some optical wavelengths, other materials might be advantageous as compared to silicon.

All-Optical Mach-Zehnder Modulator

We describe an all-optical Mach-Zehnder modulator based on a single-photon absorption (SPA) process, fabricated entirely in silicon. Our single-photon absorption modulator is based on a process by which a single photon at 1.55 μm is absorbed and an apparently free-carrier mediated process causes an index shift in silicon, even though the photon energy does not exceed that of silicon's bandgap. We demonstrate all-optical modulation with a gate response of 1 degree/mW at 0.5 GBit/s. This is over an order of magnitude more responsive than typical previously demonstrated devices. Even without resonant enhancement, further engineering may enable all optical modulation with less than 10 mW of gate power required for complete extinction, and speeds of 5 GBit/s or higher.

We have demonstrated all-optical modulation in silicon with a novel single photon mechanism. Our device achieves modulation at power levels an order of magnitude lower than typical all-optical modulators in silicon. We believe that bandwidths in the tens of gigahertz and peak modulation powers on the scale of 10 mW are achievable. With such performance, it will be possible to obtain broadband all-optical signal gain, enabling chip-scale optical transistors to be integrated into all-optical integrated logic circuits.

Figure 1:
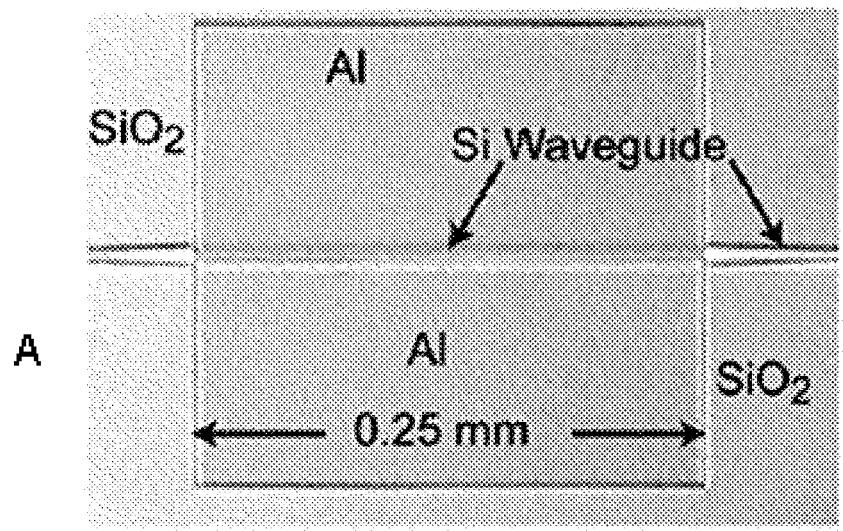
FIG. 1A is a diagram in plan of a prior art optical modulator fabricated using ion implantation to produce damage in a silicon waveguide.
FIG. 1B is a diagram in elevation of the prior art optical modulator illustrated in FIG. 1A.
Figure 1:
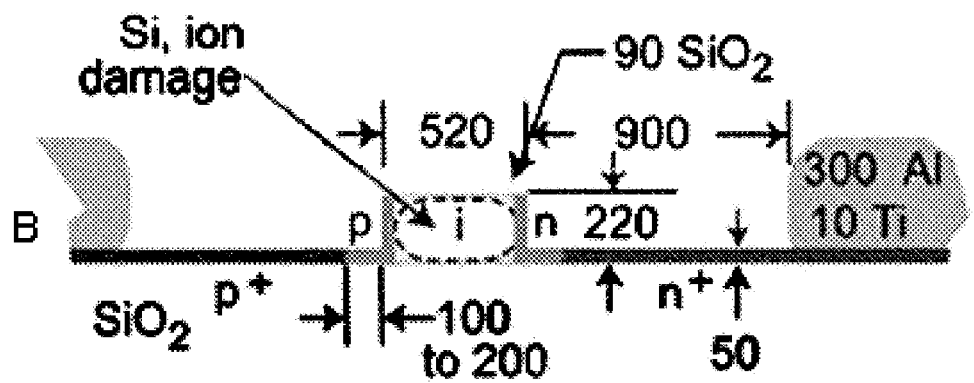

Geis et al. ("CMOS-Compatible All-Si High-Speed Waveguide Photodiodes With High Responsivity in Near-Infrared Communication Band," *IEEE Photonics Technology Letters*, vol. 19, pp. 152-154, 2007) demonstrated an efficient photodetector at 1.55 μm based on a single-photon absorption mechanism, achieving greater than 50% quantum efficiency at speeds up to 10 GHz. This photodetector utilized absorption centers created in a waveguide by ion damage (e.g., implanting silicon with silicon ions), which enabled absorption of photons at energies below the bandgap, which absorption appears to be correlated with the defects in the volume of the semiconductor. Single photon absorption was also observed in undamaged samples, and attributed to surface-state absorption. The photodetector is illustrated in FIG. 1A and FIG. 1B. Similar linear photocurrent responses have been observed, both due to volume defects and due solely to the waveguide surface states, for example in J. D. B. Bradley, et al., "Silicon waveguide-integrated optical power monitor with enhanced sensitivity at 1550 nm," *Applied Physics Letters*, vol. 86, art. no. 241103, 2005, in Y. Liu et al., "In-line channel power monitor based on helium ion implantation in silicon-on-insulator waveguides," *IEEE Photonics Technology Letters*, vol. 18, pp. 1882-1884, 2006, and in T. Baehr-Jones, M. Hochberg, and A. Scherer, "Photodetection in silicon beyond the band edge with surface states," *Optics Express*, vol. 16, pp. 1659-1668, 2008. It has been hypothesized that defects create mid-bandgap states, enabling an electron to reach the conduction band from the valence band, but the precise mechanism is not yet fully understood. These investigations did not deal with modulation effects, but rather simply with photodetection.

It is well known that surface states cause optical loss in silicon waveguides. Most low-loss geometries involve large silicon waveguides, on the scale of 0.450 μm×0.250 μm and 2 μm×0.9 μm, which minimize the interaction of the optical mode with surface states. In our single-photon absorption modulator, we use a smaller 0.5×0.1 μm ridge waveguide resulting in a very large electric field at the etched surfaces. The fabrication of ridge waveguides in silicon, such as the 0.5×0.1 μm ridge waveguide, has previously been described in several of our previous patent documents, including U.S. Pat. Nos. 7,200,308 and 7,424,192, and in published application US2007/0035800 A1, all of which are incorporated by reference herein in their entirety. By electrically contacting the silicon waveguides, we have demonstrated that a linear photocurrent can be observed, with a quantum efficiency of 2.8%. We have identified that the region responsible for the photocurrent was the waveguide surface, though the precise mechanism was not determined Mach-Zehnder Device Layout and Test Layout We use the surface-absorption process to build an all-optical modulator. We introduce a gate optical mode into one arm of a Mach-Zehnder interferometer. The single-photon absorption process occurs, and an unbalanced refractive index shift occurs in one of the arms, causing constructive or destructive interference in a signal beam that is provided to the input port of the Mach-Zehnder interferometer, with the output observed at an output port of the Mach-Zehnder interferometer.

Figure 2A:
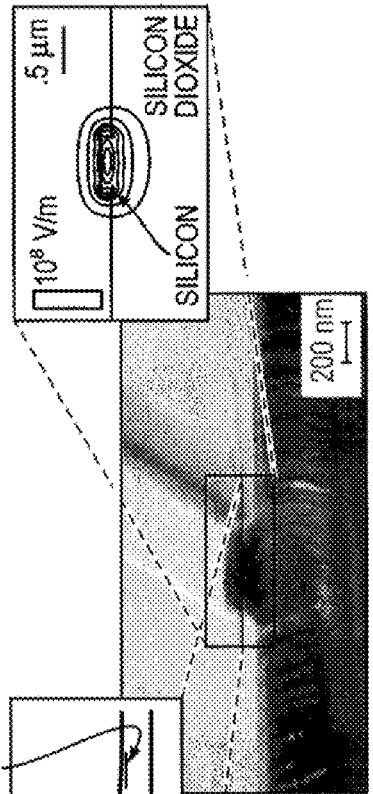
FIG. 2A through FIG. 2C illustrate an exemplary embodiment of a waveguide that is useful to provide single photon absorption modulator device layout, with some of the properties of the modulator, according to principles of the invention.
Figure 2B:
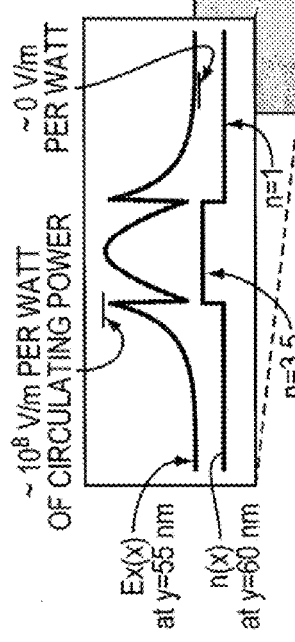
Figure 2C:
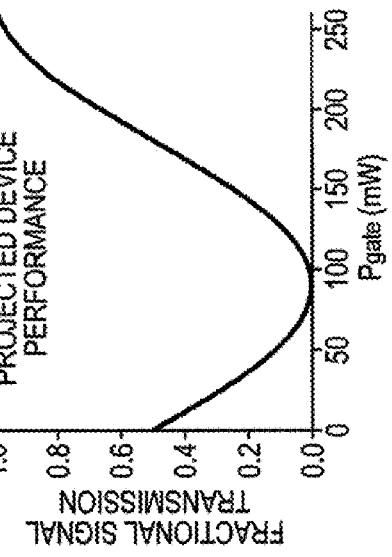

FIG. 2A is diagram showing a SEM micrograph of cleaved ridge waveguide with the modal pattern for the TE-1 mode. The contours in the diagram on the right are drawn in |E| in increments of 10% of max value. For a propagating power of 1 W, the peak electric field is on the order of $10^8$ V/m. The plot on the left shows a plot of $E_x$ across the center of the waveguide. FIG. 2B is a diagram showing an optical image of the single-photon absorption modulator, with the gate and signal optical modes illustrated. $P_{gate}$ indicates the location that the gate optical mode is mixed into a Mach-Zehnder arm with a y-junction, and begins to cause a phase delay, labeled $\Delta\phi$, in the signal mode. The gate power as discussed herein is always the propagating power at this point in the waveguide. The input port to the Mach-Zehnder is indicated by the port on the lower right of the figure having an arrow pointing thereto, indicating that the input signal is applied to that port. The output port of the Mach-Zehnder is the port in the bottom middle of the figure having two arrows pointing away therefrom, indicating that the output signal is provided at that port. The output port of the Mach-Zehnder is so labeled explicitly in FIG. 3A. Thought not visible in this image, there is a corresponding y-junction on the opposing arm, ensuring that the Mach-Zehnder is balanced. FIG. 2C is a diagram showing the idealized transmission of the signal, for a device with a gate response of 1 degree/mW and a bias point of 90 degrees.

Referring to FIG. 2B, showing the device geometry, the arm lengths of the devices that we tested ranged from 0.75 to 1.25 cm, and the arms were unequal in length within each device, with differences ranging from 150 μm to 600 μm. This length inequality allows us to control the intrinsic phase shift between the arms by tuning the signal wavelength. Typical waveguide losses in these devices were 6 dB/cm. Input coupling is achieved from a polarization-maintaining fiber array via grating couplers.

The device performance is best characterized by the phase shift induced per unit gate power. A gate response of 1 degree/mW corresponds to around 180 mW for complete extinction of the signal mode, if the gate response remains linear at higher powers. The power level required to obtain extinction of the signal, which we call P$\pi$, is analogous to the V$\pi$ associated with an electro-optic modulator.

Figure 2D:
FIG. 2D is a SEM micrograph of a detector device.
Figure 2E:
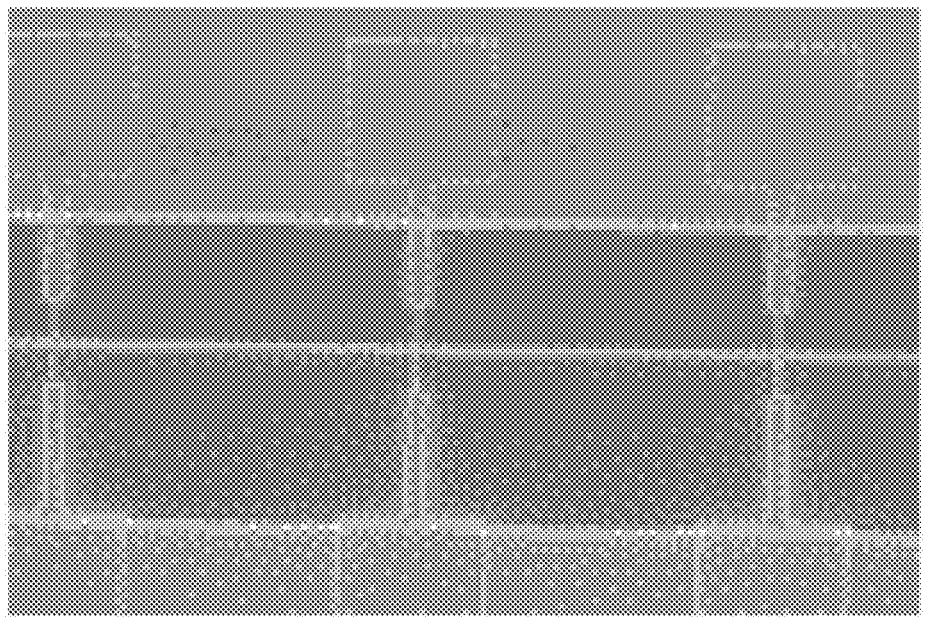
FIG. 2E is another SEM micrograph of a device.

In FIG. 2D there is shown an SEM micrograph of a detector device of type B, as defined herein below. In FIG. 2E there is shown another SEM micrograph of a device of type B. A ridge waveguide is contacted by a series of tiny, conductive arms. The optical mode is tightly confined to the ridge waveguide, and does not appreciably touch the metal pads or the surrounding silicon layer.

Fabrication Information

Devices were fabricated in electronics-grade silicon-on-insulator (SOI) wafers supplied by Soitec (Soitec USA Inc., 2 Centennial Drive, Peabody, Mass. 01960), doped at around $10^{15}$ dopant atoms (Boron)/cm$^3$. No implant or irradiation was performed on the silicon material. The starting silicon material was thinned to about 110 nm by dry oxidation, separated into small chips, and patterned with electron-beam lithography using a 100-kV electron-beam writer using hydrogen silsesquioxane (HSQ) resist. The samples were etched with chlorine in an inductively coupled plasma etcher. No cladding layer was deposited. The SOI wafer serves as a substrate for the fabricated devices.

Testing with Pseudo-Random Bit Sequence

Initial testing was done by modulating the gate beam with a pseudo-random bit sequence. A modulated gate optical mode on the order of 25 mW propagating power in the waveguide with 50% extinction was used, and this was directed into the gate port of the modulator. To assist the measurements and enhance the effect by increasing the optical power levels, two Erbium Doped Fiber Amplifiers (EDFA) were used. The signal beam was set to a wavelength such that there was an intrinsic 90 degree modulator bias point. We obtained eye diagrams at 300 and 500 MBit/sec, as shown in FIG. 3.

Figure 3A:
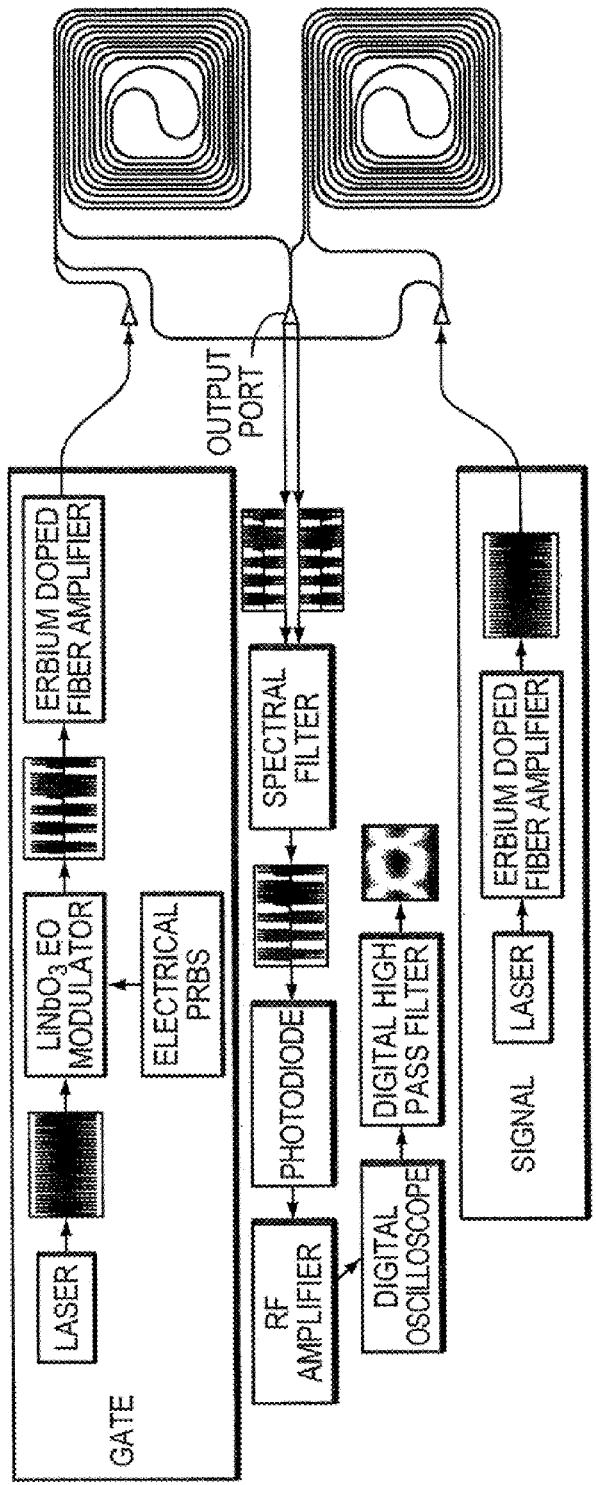
FIG. 3 is a diagram showing an illustrative experimental setup used to measure the response of the single photon absorption modulator, and showing eye-patterns observed, according to principles of the invention.
Figure 3C:
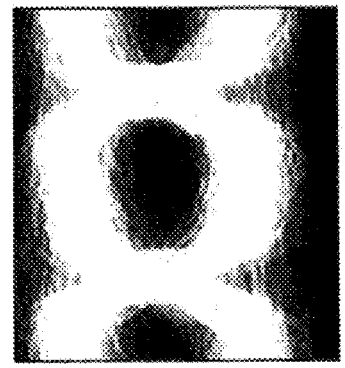
Figure 3B:
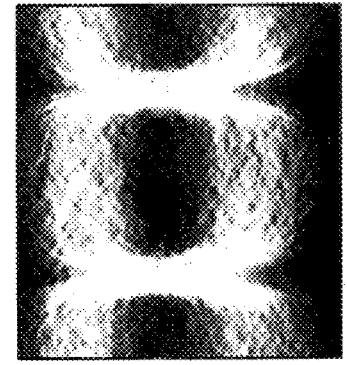

FIG. 3A is a diagram showing an illustrative experimental setup used to measure the response of the single-photon absorption modulator, and used to obtain an eye-pattern. FIG. 3B is a diagram showing an eye-pattern obtained at 300 MBit/sec. FIG. 3C is a diagram showing an eye-pattern obtained at 500 MBit/sec.

As shown in FIG. 3A, the gate is supplied with a signal generated using a laser source feeding a signal to an electro-optical modulator, such as a lithium niobate (LiNbO$_3$) electro-optical modulator that is driven by an electrical pseudo-random binary sequence (PRBS) generator. The signal from the electro-optical modulator is amplified by an EDFA, and applied to the gate port. The input signal applied to the input port of the Mach-Zehnder is generated using a laser signal that is amplified by an EDFA. The output from the Mach-Zehnder is observed after being passed through a spectral filter, and detected with a photodiode that provides an electrical signal representative of the output of the Mach-Zehnder. The electrical signal is amplified with an RF amplifier, and provided to the input of a digital oscilloscope. The signal is processed with a digital high pass filter and displayed to a user or recorded as may be desired.

It is important to note in FIG. 3 that the spectral filter placed in the modulator output preferentially removes the original gate optical frequency, leaving only the signal frequency. As a result, the open eye pattern demonstrates that the bit pattern on the gate mode has been transferred via the all-optical modulator to the signal mode. This type of operation is likely to be of use in the construction of future all-optical networks.

Figure 4:
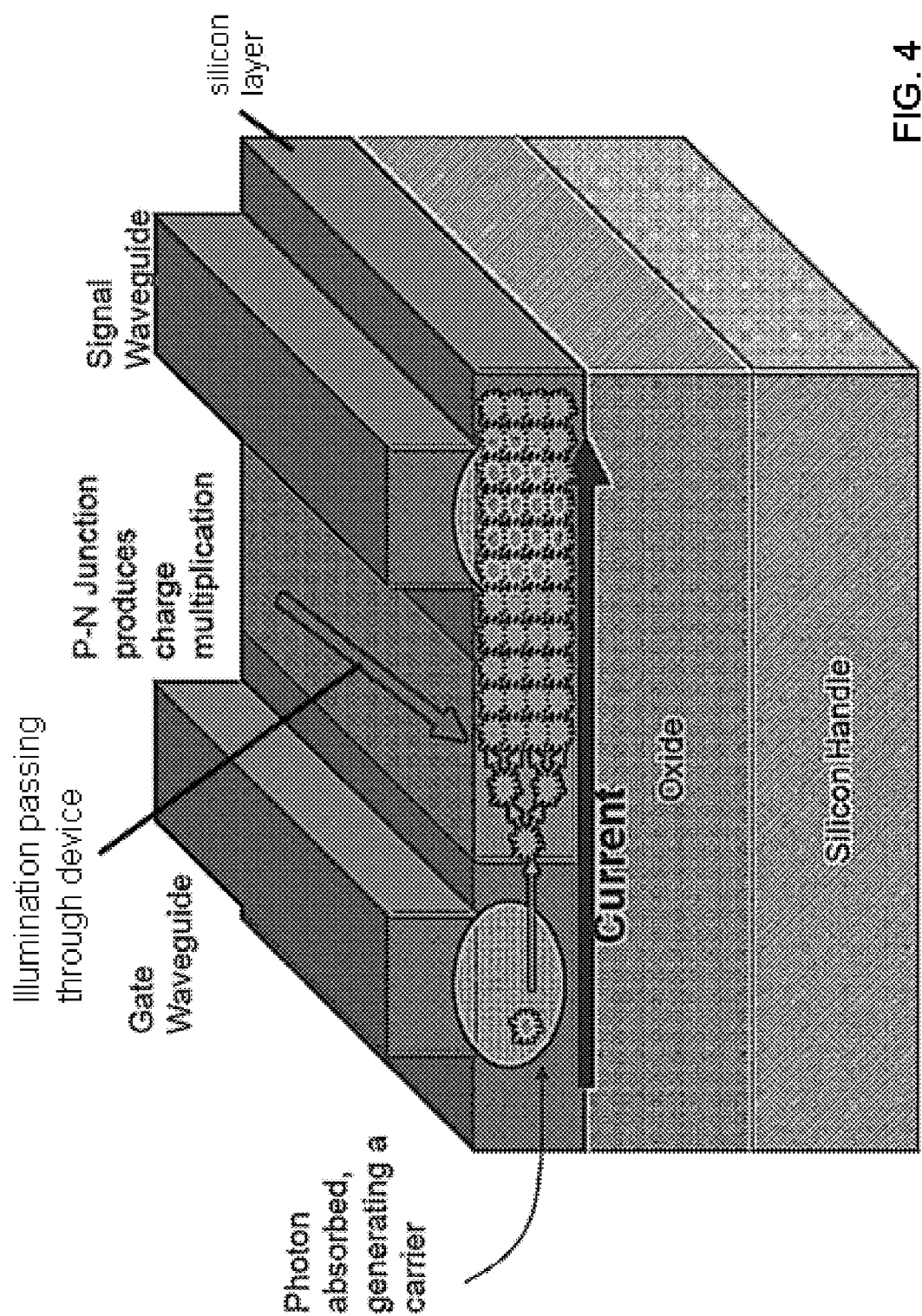
FIG. 4 is a diagram in perspective illustrating the structure and operation of a portion of an all-optical transistor.

FIG. 4 is a diagram in perspective illustrating the structure and operation of a portion of an all-optical transistor. The all-optical transistor can be expected to operate as follows. Light comes in on a 'gate' waveguide and a 'signal' waveguide. Photons from the gate waveguide are absorbed through a single-photon process. A lateral bias provided by applying a voltage across electrodes on the silicon device sweeps the carriers toward the signal guide. These carriers are multiplied through an avalanche process in the semiconductor. A phase shift is created by this large population of carriers in the signal guide. This phase shift is translated into amplitude modulation by utilizing a Mach-Zehnder interferometer.

Figure 5A:
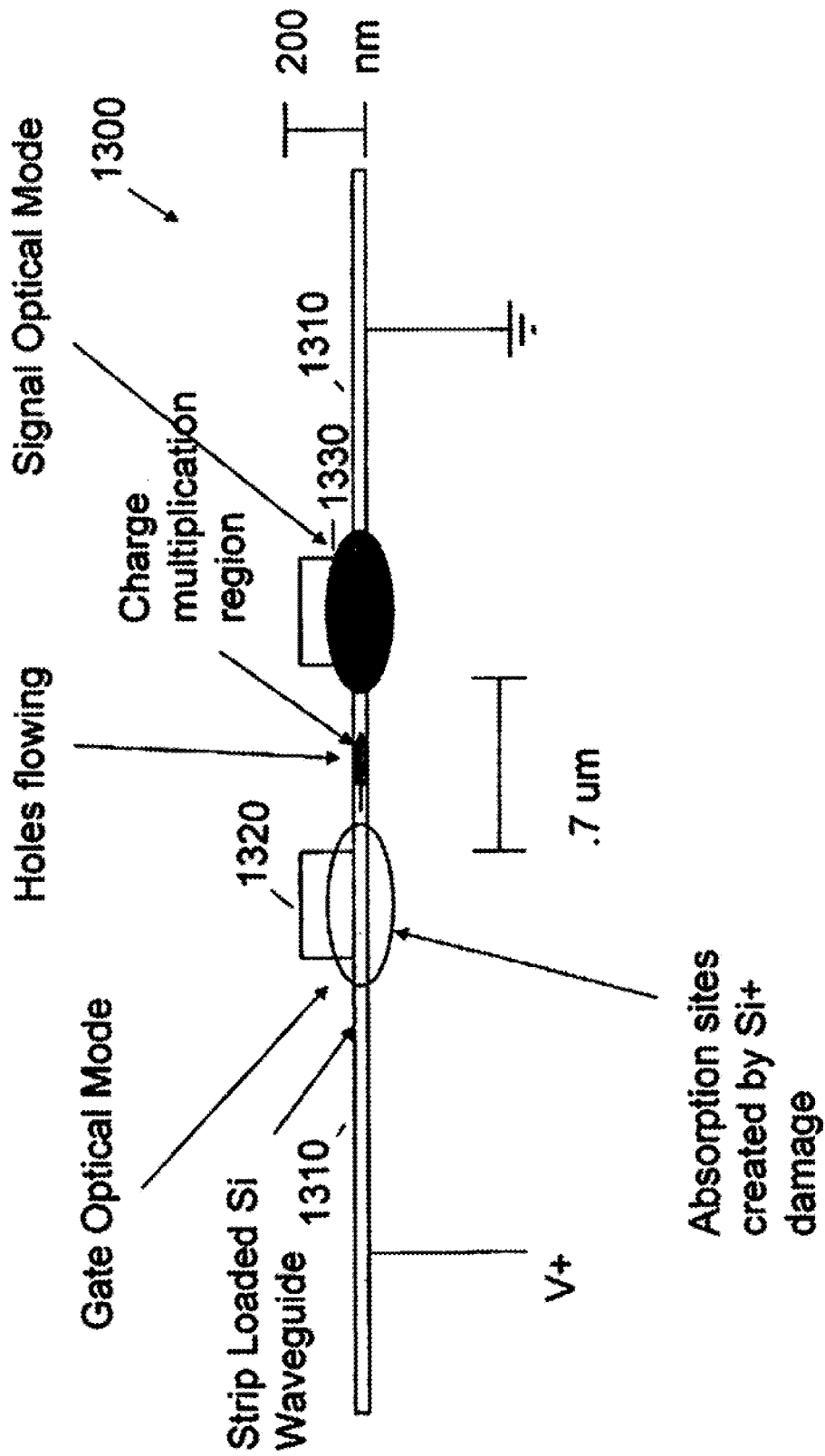
FIG. 5A is a diagram in side view of a portion of an illustrative all-optical transistor.

FIG. 5A is a diagram 1300 in side view of a portion of an illustrative all-optical transistor. In FIG. 5A, a structure similar to that of FIG. 4 is described. In the illustrative embodiment of FIG. 5A, a silicon layer 1310 is provided, which can be, for example a silicon layer of a silicon-on-insulator (SOI) wafer fabricated on a silicon wafer substrate. The silicon layer 1310 is doped with conventional dopant atoms, such as those from column III of the periodic table (to provide holes, or p-type material) or those from column V of the periodic table (to provide electrons, or n-type material). Silicon optical waveguides 1320 and 1330 are shown end on. In one embodiment, the two waveguides are separated by a distance of 0.7 $\mu$m, and have a thickness or height of approximately 200 nm. In one embodiment the waveguide 1320 can be the gate waveguide, adjacent to which the silicon layer 1310 may have been deliberately damaged, for example by ion implantation with silicon ions, and the waveguide 1330 can be the signal waveguide. The damaged silicon layer may absorb a photon from the gate waveguide 1320. Under the application of an electrical field across the silicon layer 1310, as illustrated by the connection of a positive voltage V+ on one side of the layer 1310 and the connection of the other side of the layer 1310 to ground potential, the carriers generated are accelerated, and charge multiplication by an avalanche process is caused to occur. The charges so generated affect the optical properties of the signal waveguide 1330, which can be one leg of a Mach-Zehnder interferometer (with the other leg not illustrated in FIG. 5A).

Figure 5C:
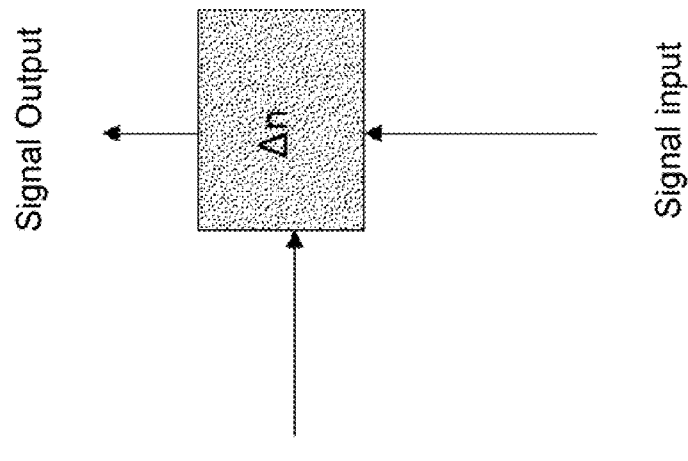
FIG. 5C is a schematic diagram illustrating the logical layout of an illustrative all-optical transistor.
Figure 5B:
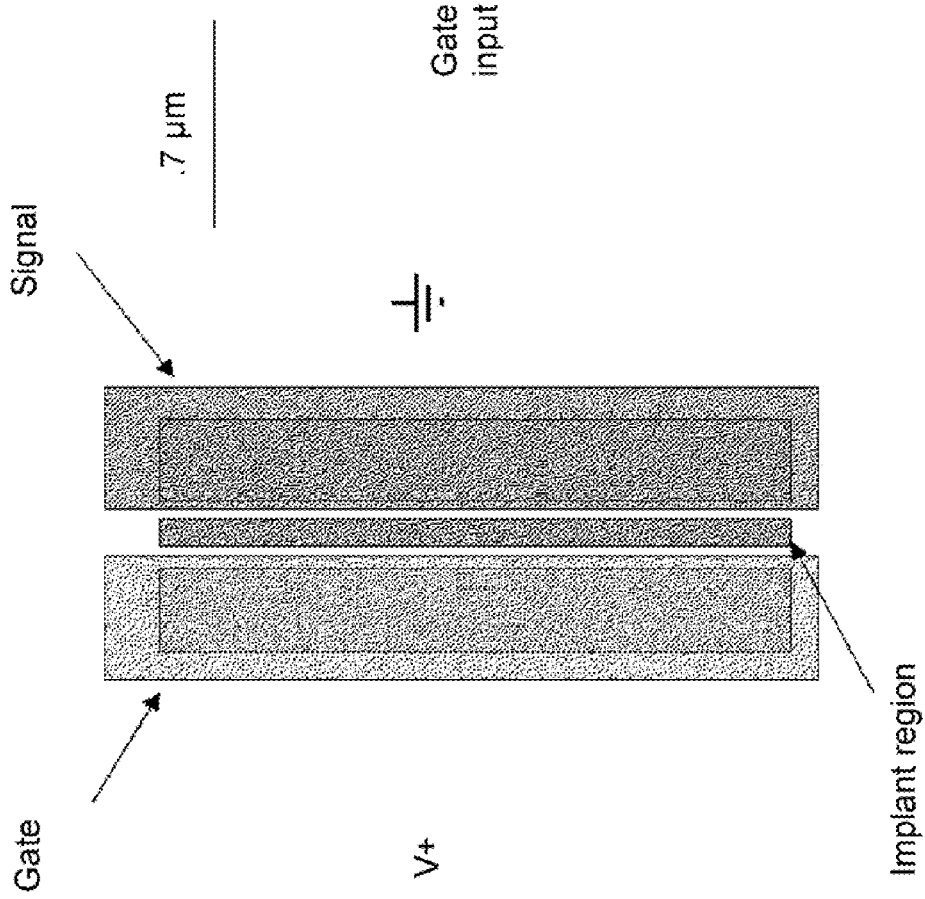
FIG. 5B is a diagram in plan view of a portion of an illustrative all-optical transistor.

FIG. 5B is a diagram in plan view of a portion of an illustrative all-optical transistor, such as that of FIG. 4. FIG. 5B shows the relative placement of the gate waveguide, the signal waveguide, the implant region, and the positions where the voltage signals are expected to be applied to the device. The implant region comprises one or more implanted ionic species, such that the desired (or optimal) p/n distribution will depend on the quantum mechanism operative in the junction region. For comparison, a line representing a distance of 0.7 $\mu$m is also shown.

FIG. 5C is a schematic diagram illustrating the logical layout of an illustrative all-optical transistor. In FIG. 5C the signal input is fed to a signal waveguide that is one arm of a Mach-Zehnder interferometer, and the gate input is fed to a gate waveguide that provides a modulation signal that modulates the optical index (e.g., causes a $\Delta$n) of the signal waveguide causing a modulation of the signal output.

Figure 6:
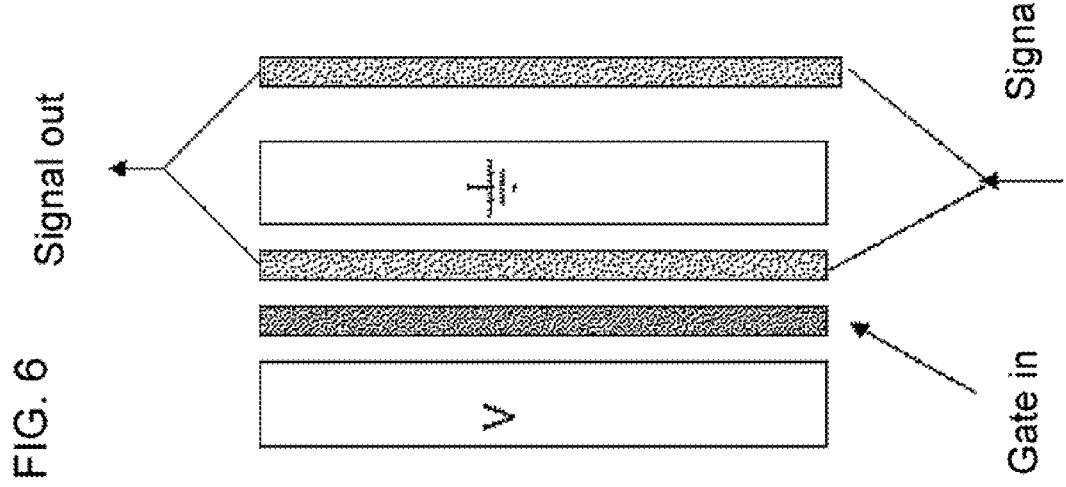
FIG. 6 is a schematic plan diagram showing the layout of an all-optical transistor that comprises a Mach-Zehnder interferometer geometry, in which one arm of the Mach-Zehnder is the signal waveguide of FIG. 5A and FIG. 5B.

FIG. 6 is a schematic plan diagram showing the layout of an all-optical transistor that comprises a Mach-Zehnder interferometer geometry, in which one arm of the Mach-Zehnder is the signal waveguide of FIG. 5B.

Figure 7:
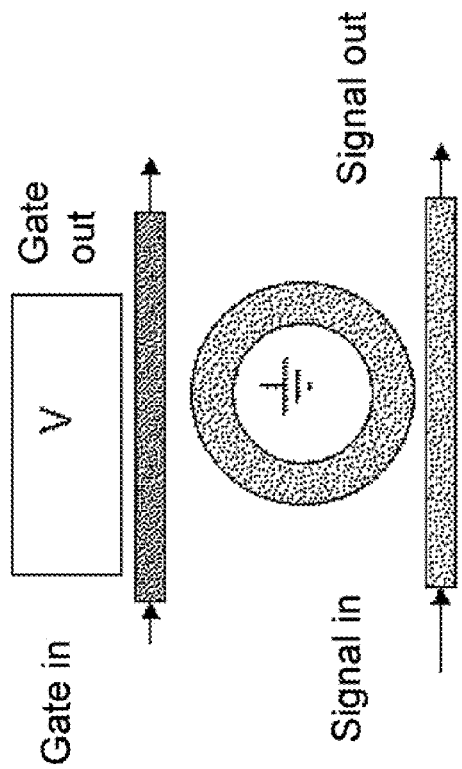
FIG. 7 is a schematic plan diagram showing the layout of an all-optical transistor that comprises a ring resonator geometry.

FIG. 7 is a schematic plan diagram showing the layout of an all-optical transistor that comprises a ring resonator geometry.

The all-optical Mach-Zehnder switch can be envisioned for use as an amplifier, an all-optical logic element, or a nonlinear all-optical signal processing element that could operate at 100 GHz. The operation of the device could be tuned by controlling the DC bias.

Figure 8:
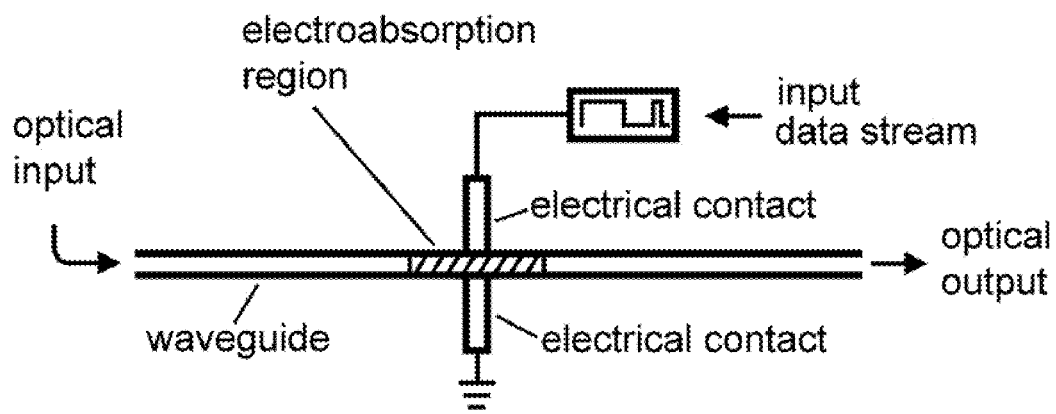
FIG. 8 is a diagram illustrating an electroabsorption modulator based on Fermi level tuning, according to principles of the invention.

Referring to FIG. 8, a novel electroabsorption modulator based on tuning the Fermi level relative to the energy of deliberately created mid-gap states in a semiconductor is disclosed. The theoretical basis for understanding the occupancy of mid-gap states as a function of the Fermi level position is well understood, and is only briefly described herein in non-mathematical terms to provide an explanation for those who may not have a deep understanding of quantum mechanics. For a more rigorous discussion of electronic bandgaps, energy states, Fermi levels and the like, one may consult a text such as S. M. Sze, *Physics of Semiconductor Devices*, $2^{nd}$ Edition (New York: Wiley, Copyright 1981).

Briefly, atoms are believed to have energy states for the electrons that they contain. Crystalline and even amorphous materials comprising large numbers of atoms have energy bands which are believed to arise from the ability of charge carriers such as electrons to move or be exchanged among the atoms of the material, from a quantum mechanical perspective the electrons are considered to be delocalized. According to one view, the individual electronic energy levels of the constituent atoms hybridize creating a set of energy levels that can be characterized by bands of nearly continuous energy levels and gaps where no energy levels exist. In materials known as non-degenerate semiconductors, under quiescent conditions, the charge carriers fill bands of energy states below what is called a bandgap (or a region of energy space where energy states are normally not present), and bands above the bandgap are lacking in electrons. The bands below the bandgap are known as valence bands, and bands above the bandgap are called conduction bands. In the typical semiconductor, the promotion of charge carriers above the bandgap from the valence band to the conduction band results in an appreciable increase in the electrical conductivity of the semiconductor material. Dopants can also be added that provide charge carriers, and that increase the conductivity of the semiconductor. Energy states situated in the bandgap (where normally no states exist and no charge carriers normally reside) can be deliberately produced by adding dopants, or by deliberately damaging the semiconductor material structure by various methods such as bombardment with particles or large energy fluxes.

If one considers energy bands as analogous to the levels of floors in a building, with higher floors in the building representing increasing energy (for example in a gravitational field), the valence band could be considered ground level and the conduction band the first floor. The energy difference between the two floors would be taken as the bandgap energy. Charged particles would be stable if situated on either floor but are not stable if situated between floors. From a quantum mechanical perspective, "stable" and "unstable" refer to real and virtual states where the virtual states are associated with higher order transitions. The Fermi level represents the probability transition point for particles, such as electrons, in thermodynamic equilibrium. Electrons are very likely to be found below the Fermi level and much less likely to be found above the Fermi level. The Fermi level is based on quantum mechanical calculations that take into consideration the statistical dynamics of fermions (e.g., particles that cannot occupy the same quantum mechanical state simultaneously), as distinct from bosons (e.g., particles that can occupy the same quantum mechanical state simultaneously). Fermions (such as electrons) obey Fermi-Dirac statistics, and bosons (such as photons, or light waves) obey Bose-Einstein statistics. For normal semiconductors, the Fermi level is situated somewhere in the bandgap. By applying energy at least equal to the band gap energy, charged particles such as electrons may become energetic enough to be promoted from the valence band to the conduction band. However, in the absence of mid-gap states (analogous to stable locations between the floors of a building, such as rungs on a ladder that connects the ground and first floors), an electron can not absorb less energy than the gap as no real stable states exist corresponding to this energy. In the presence of mid-gap states, an electron that acquired too little energy to make the full bandgap transition might move from one band to the other by way of an intermediate "stable" mid-gap state. A second energy excitation might then cause the electron to gain sufficient energy to reach the conduction band, when either the first or the second energy excitations were individually too weak to accomplish the transition alone. Statistically, the second energy excitation might also cause the electron to fall back to the valence band (e.g., fall off the ladder to the ground floor).

The electroabsorption modulator of FIG. 8 includes a semiconductor waveguide that has an input port and an output port. Between the input port and the output port is a section of the waveguide that is configured to function as an electroabsorptive region. Adjacent to the electroabsorptive region are electrical contacts. In operation, signals such as voltages may be applied between the pairs of electrical contacts. By adjusting voltages on the electrical contacts, the Fermi level (or quasi-Fermi level as described below) in the electroabsorptive region of the semiconductor waveguide is controlled. In response to an applied signal between the pair of electrodes, the Fermi level is brought above or below the energy levels of deliberately created mid-band-gap electronic states. As these mid-band-gap electronic states transition between occupancy by an electron and vacancy (absence of an electron), the absorption coefficient for optical radiation in the electroabsorptive region of the semiconductor material changes. This change in absorption coefficient modulates the intensity of transmitted radiation passing through the electroabsorptive region. By responding to an input data stream driving the applied voltages, the device functions as a semiconductor optical modulator in accordance with the principles of the invention.

In operation the magnitude of the intensity modulation of the transmitted radiation is sufficient to distinguish a 1 in a digital data stream from a 0 in the digital data stream. By way of example, in various telecommunication systems that operate according to standards set by the ITU or other standard setting bodies, the signal defining a 1 and the signal defining a 0 in the data stream are specified as to their characteristics, which are published so that systems built and/or operated by different vendors can communicate with each other. It is contemplated in this disclosure that the magnitude of the signal variation associated with the modulation will depend on the implementation details of the modulator as part of a specific telecommunications or data processing environment, and that to be effective, the modulator will have to provide signals that are compatible with the associated standards. While the input data stream is described as digital data, the voltages applied across the pairs of electrical contacts can be digital in nature, or can be analog voltages. In the situation where one member of an electrical contact pair is connected to a reference signal or voltage (for example ground potential, "zero volts," or some other fixed potential) a signal representing a differential voltage relative to the reference voltage can be applied to only the second electrical contact, and that signal can be effective to control the operation of the electro-absorptive region response to the electrical contact pair. The differential signal can in principle vary above and/or below the reference voltage.

In one illustrative embodiment described below, the invention is implemented in damaged silicon and described with respect to radiation having a free space wavelength of 1.55 microns. This embodiment is illustrative only and in no way limiting as the principles of the invention can equally be applied to other waveguide systems employing other semiconductors such as various III-V compounds and amorphous semiconductor compounds including but not limited to amorphous silicon. Further, the principles of the invention can equally be applied to systems operating at different optical frequencies including but not limited to NIR, MIR and FIR radiation such as radiation in the bands 1310 nm, 1490 nm and radiation in the range of 1 μm to 30 μm.

Mid-Bandgap States

As described in co-pending International Application PCT/US09/33516, photodetection beyond the bandgap in silicon has been observed in a novel damaged silicon system. Radiation with a free space wavelength near 1.55 micrometers was observed to produce a linear photocurrent. As described therein, one concludes that a single photon absorption mechanism was present. This data supports the existence of states within the bandgap. These states were deliberately created by damaging the silicon lattice, or adding a dopant.

An appreciable photocurrent in damaged silicon under near infrared irradiation is made possible by the mid-bandgap states, in the circumstance that the energies of the mid-bandgap states relative to the valence band correspond to the energy of the impinging photons. In the absence of mid-bandgap states, the absorption would be quite small as there would be no stable states available to electrons excited by an absorption process that involved only a single photon having less energy than the bandgap. That is, in the absence of mid-gap states, even if an electron were to absorb a photon having less than the energy of the bandgap, it would simply re-emit a photon of equal energy when it fell back to the conduction band. Only higher order (e.g., multiple photon absorption) processes would be possible. The probabilities for such higher order processes are significantly smaller. This is why under ordinary circumstances silicon is fairly transparent to radiation with a free space wavelength of 1.55 micrometers (or longer).

Figure 9:
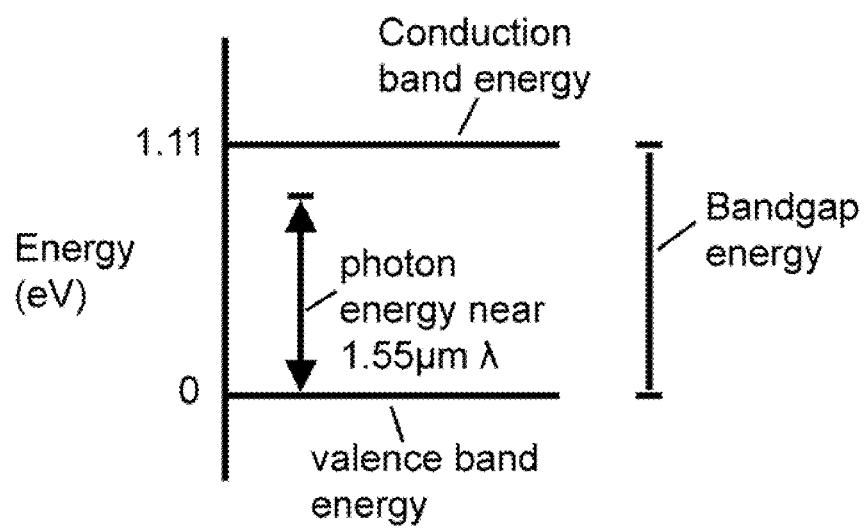
FIG. 9 shows the energy band diagram for normal undamaged silicon.
Figure 10:
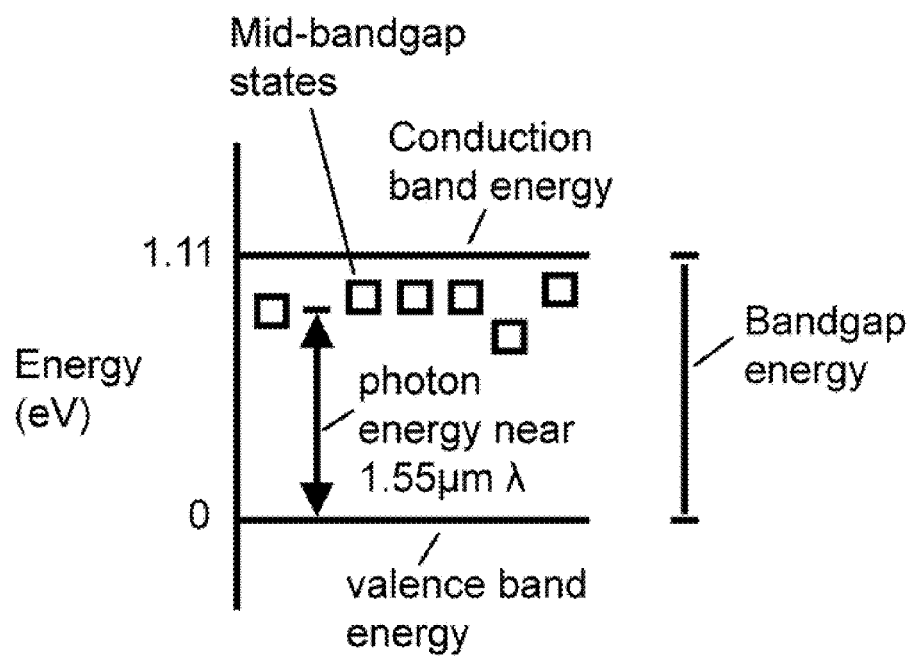
FIG. 10 shows the energy band diagram for silicon with the presence of mid-bandgap states, the mid-bandgap states allowing for modulated electroabsorption according to principles of the invention.

The ability of mid-bandgap states to generate an appreciable photocurrent in damaged silicon under near infrared irradiation is further illustrated by FIG. 9 and FIG. 10. FIG. 9 shows the energy band diagram for normal undamaged silicon with its energy bandgap. This energy corresponds to the energy difference between electronic states at the top of the valence band and the bottom of the conduction band. At normal operating temperatures, the valence band states are mostly filled with electrons and the conduction band states are mostly unoccupied (equivalent to being filled with holes). The presence of adjacent empty states in the conduction band is what allows for electronic transport. The relationship governing the short wavelength limit of electromagnetic radiation as a function of energy in eV is $\lambda=1.240$ micron/eV. The photon energy for near infrared light of wavelength close to 1.55 micrometers is approximately 0.8 eV. This corresponds to an energy difference that falls in the bandgap. This means that under normal circumstances, silicon cannot efficiently absorb radiation near 1.55 micrometers in a single photon process. As higher order processes are required, excitation to the conduction band is suppressed to a very great degree. However, as shown in FIG. 10, the situation is markedly different with the presence of the mid-bandgap states in suitably modified silicon. Here final states with the appropriate energy do exist and photons can readily be absorbed by electrons, thereby transitioning from the valence band to the available mid-bandgap states. A second photon at 1.55 micrometers then provides more than sufficient energy to promote an electron from a mid-gap state to the conduction band.

It is important to note that the term mid-bandgap states refers to states that have energy levels roughly in the middle of the bandgap, but not precisely at (Ev+Ec)/2 or approximately 0.56 eV above the valence band. For radiation with a free space wavelength of 1.55 micrometers, mid-bandgap states designed to absorb this radiation would be approximately near an energy level 0.8 eV above the valence band. This is around 72% of the bandgap energy in silicon. States having energies more than 1.12−0.8=0.32 eV away from both the valence band and the conduction band (e.g., at least 0.32 eV above the valence band, and at least 0.32 below the conduction band) would provide significant opportunity for absorption of incident 1.55 micron radiation. The absorption can occur via either a single photon processes with the excitation of an electron from the valence band to the mid-bandgap state or via a two photon processes with a first excitation to the mid-bandgap state and a subsequent excitation to the conduction band. By way of comparison for other embodiments employing different wavelength light, 1.31 micron (1310 nm) radiation has an energy of approximately 0.947 eV, 1.49 micron (1490 nm) radiation has an energy of approximately 0.832 eV, and radiation in the range of 1 micron to 30 microns has an energy of approximately 1.240 eV to 0.0413 eV. The appropriate range of mid-bandgap energy states for these embodiments is determined in a similar manner to the above analysis for 1.55 micron radiation.

Mid-bandgap states can be deliberately created in semiconductors by a variety of means, such as doping, damaging the silicon through ion implantation, or the creation of surface states. In addition devices based on the existence of these states are not limited to radiation with a free space wavelength of 1.55 micrometers. Generally, any semiconductor that has a bandgap energy larger than the photon energy of a particular range of optical frequencies will often be transparent to this optical radiation. According to the principles of the invention, this transparency can be tuned and then exploited by deliberately introducing mid-bandgap states. In this disclosure, deliberately created or deliberately introduced defects are taken to be defects other than those mid-gap defects that might naturally occur in commercially available materials from which devices are fabricated, such as commercially available silicon-on-insulator material. It is recognized that any material will have some background level of defects in its condition before being processed to make the devices of the invention, and those defects are to be distinguished from the deliberately added defects that are described herein.

Fermi-Level Tuning of Mid-Bandgap Absorption

The mid-bandgap states will only be capable of absorbing a photon if they are not occupied. Due to the Pauli exclusion principle, if an electron is present in a defect state, another electron can not be transferred into this state. From the standpoint of the optical mode, an occupied state then becomes effectively invisible; no photon absorption can occur by this state.

Figure 11:
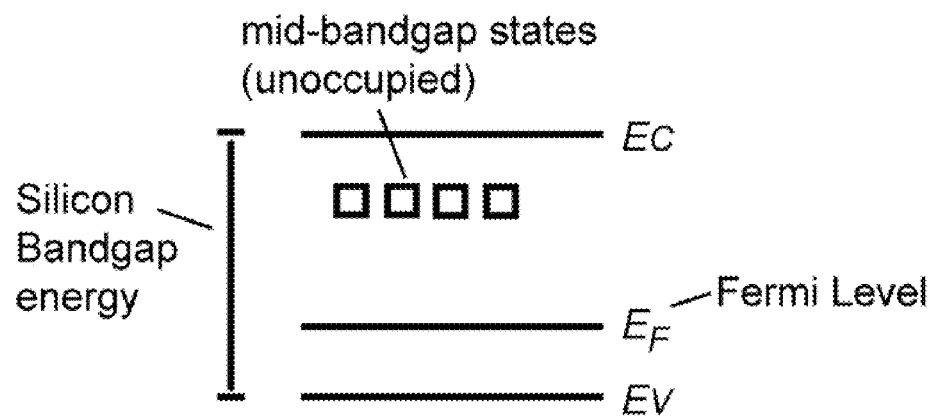
FIG. 11 shows a silicon energy band diagram with the Fermi level tuned below unoccupied mid-bandgap states, important for absorption coefficient modulation according to principles of the invention.
Figure 12:
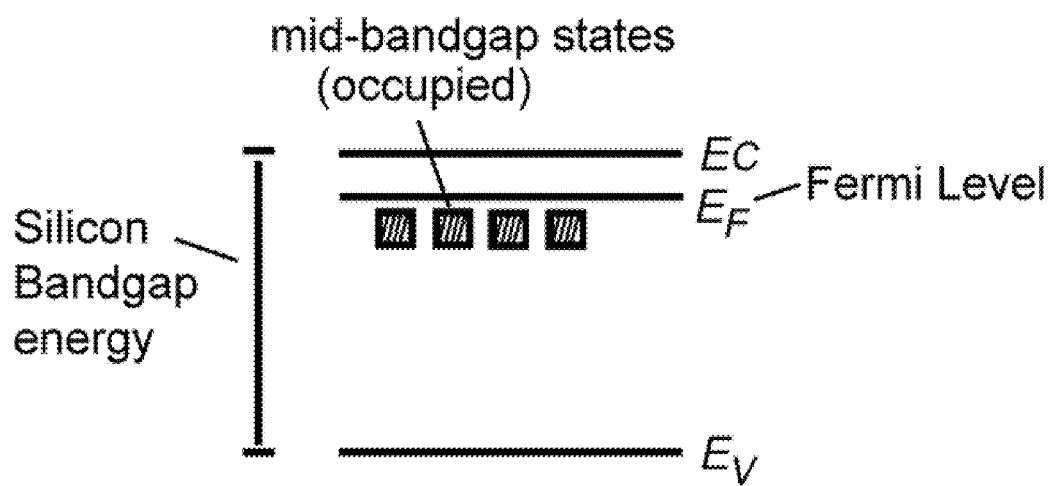
FIG. 12 shows a silicon energy band diagram with the Fermi level tuned above occupied mid-bandgap states, important for absorption coefficient modulation according to principles of the invention.

As indicated above, the Fermi level in a semiconductor is a method of quantifying the probability of finding an electron present at a given energy level. If the Fermi level is far below a given energy level, then the energy level is likely to be unoccupied. On the other hand, as the Fermi level approaches and passes an energy level, the probability than an electron will be found in the specified state grows and then approaches one. FIG. 11 and FIG. 12 illustrate these two possible relationships of the Fermi level relative to the mid-bandgap states. In FIG. 11, the Fermi level is far below the mid-bandgap states. Therefore the probability that these states are occupied is very low. By contrast in FIG. 12, the Fermi level is above the mid-bandgap states. Hence the probability that these states are occupied is high.

When an applied voltage is present and current is flowing, a semiconductor leaves equilibrium, and the concept of a Fermi level no longer precisely holds. However, one can still define quasi-Fermi levels that determine the number of electrons and holes that are found in a given region. For example, the random probability of finding an electron in a mid-bandgap state will likely increase when there are more electrons in the conduction band, and, correspondingly, more holes in the valence band.

Electroabsorption Modulator Based on Fermi-Level Tuning

It is possible to tune the quasi-Fermi levels in a semiconductor material by a number of different mechanisms. One can apply a reverse bias to a P-N junction, or apply a strong field through an insulating material. These techniques are typically used in conventional semiconductor devices to define transistors and other such devices.

With the presence of mid-bandgap states, tuning the quasi-Fermi levels will strongly affect the optical absorption of the material. As a result under the proper circumstances, an applied voltage can be used to impart an intensity modulation to an optical signal.

In one embodiment of the present invention, a semiconducting waveguide electroabsorption modulator is implemented in an integrated silicon-on-insulator (SOI) semiconductor waveguide. As shown in the cross sectional view in FIG. 13A, the semiconducting waveguide electroabsorption modulator 6 includes a central silicon waveguide 10 placed on an insulating silicon dioxide substrate 14 that in turn sits on a silicon handle 18. The silicon waveguide 10 supports the propagation of an optical mode 16. As shown in the top view in FIG. 13B, continuous wavelength light is fed into the silicon waveguide 10 via an input port 22 and intensity modulated light is extracted via an output port 26. In alternative embodiments, other forms of modulation such as phase modulation are employed according to the principles of the invention. A cross sectional view highlighting details of the silicon waveguide is shown and described above with respect to FIG. 2A. Additional operational and fabrication details regarding the silicon waveguide structure can be found in co-pending International Application PCT/US09/33516.

As shown in FIG. 13B by the dashed lines, an electroabsorptive modulator region 30 is situated between the input 22 and output 26 ports. In various embodiments the input 22 and output 26 ports can be implemented as grating couplers, etched vertical couplers, edge couplers and the like. At least the portion of the silicon waveguide located within the electroabsorptive modulator region 30 is configured to include mid-bandgap states via one of the techniques described above. In addition to the silicon waveguide 10, the electroabsorptive modulator region 30 includes at least two metal electrodes 34, 36 located on opposite sides of the waveguide. At least one of the electrodes is connected to an input data stream 38. Underneath the electrode 36 and comprising part of the waveguide 10 is a silicon electrical contact that facilitates the transmission of voltages from the electrode 36 to the central portion of the waveguide 10.

In one embodiment when negatively charged with respect to the right electrode 36, the left electrode 34 pushes electrons in an n-type silicon waveguide 10 away from the optical mode 16, exposing the mid-bandgap states and significantly increasing the absorption of the continuous wavelength radiation. In contrast when positively charged with respect to the right electrode 36, the electrode on the left 34 draws electrons in an n-type silicon waveguide 10 toward the optical mode, filling the mid-bandgap states and significantly decreasing the absorption of the continuous wavelength radiation.

In one embodiment, an operational principle of the invention is that by changing the voltage on one of the electrodes 34, 36 relative to a fixed voltage in response to the input data stream 38, the occupancy of the mid-bandgaps states is changed. This change in occupancy corresponds to a change in the absorption coefficient of the electroabsorptive portion of the waveguide structure. With the absorption coefficient modulated in response to the input data stream 38, the transmitted radiation is also modulated in response to the input data stream 38. In this manner the SOI semiconductor waveguide and electrode system 6 functions as an electroabsorption optical modulator. While we have discussed this semiconducting waveguide electroabsorption modulator with respect to a SOI embodiment, the invention could equally well be applied to other semiconducting waveguide systems with mid-bandgap states.

Figure 14A:
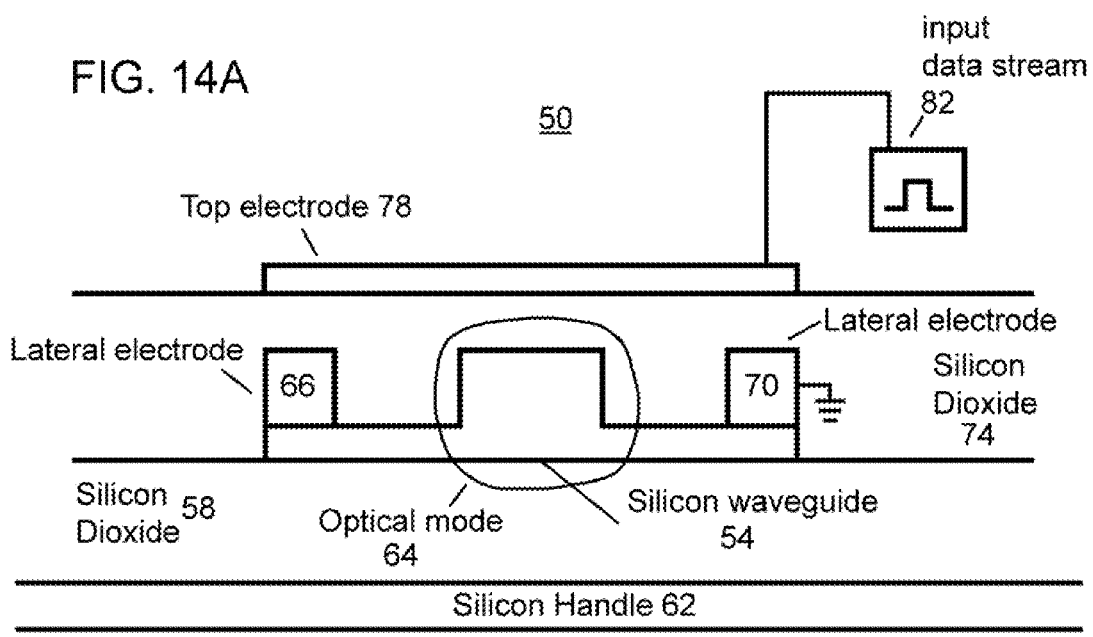
FIG. 14A, and FIG. 14B show, respectively, a cross-sectional view and a top view of one embodiment of a semiconducting waveguide electroabsorption modulator, according to principles of the invention.

In another embodiment of a semiconducting waveguide electroabsorption modulator, an electrode is placed above the waveguide, rather than in lateral relationship to the waveguide. As shown in the cross-sectional view of FIG. 14A, the semiconducting waveguide electroabsorption modulator 50 includes a central silicon waveguide 54 placed on an insulating silicon dioxide substrate 58 that in turn sits on a silicon handle 62. The silicon waveguide 54 is configured to support the transmission of an optical mode 64. At least a portion of the silicon waveguide 54 is configured to include mid-bandgaps states via one of the techniques described above. On either side of the silicon waveguide 54 are lateral electrodes 66, 70. In this configuration, the central silicon waveguide 54 and the electrodes 66, 70 can be considered a strip loaded waveguide. Covering the silicon waveguide 54 and the lateral electrodes 66, 70 is a central insulating layer 74 such as silicon dioxide. On top of the central insulating layer 74 is a top electrode 78 that is connected to an input data stream 82.

Figure 14B:
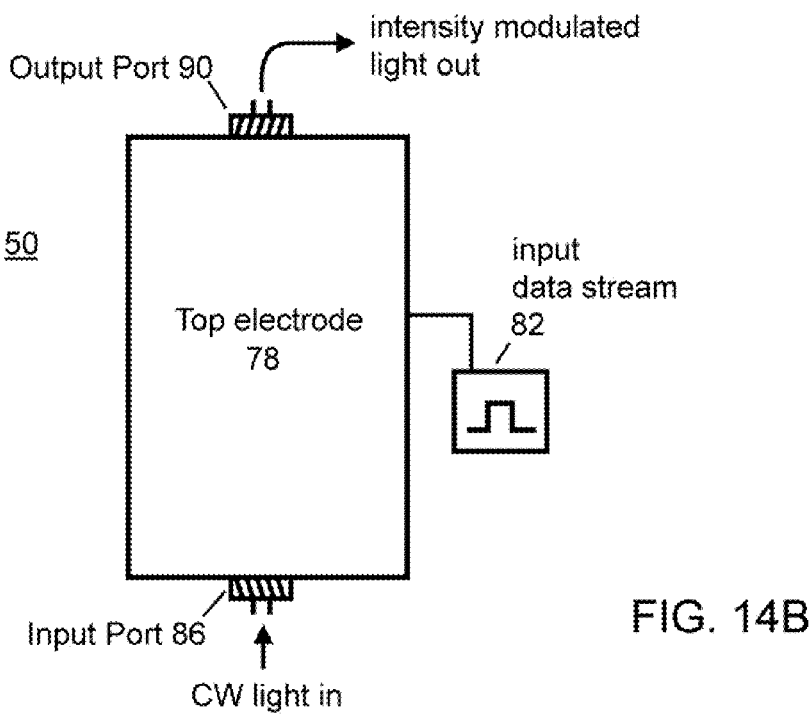

As shown in the top view of FIG. 14B, continuous wavelength light is fed into the semiconducting waveguide electroabsorption modulator 50 via an input port 86 and intensity modulated light is extracted from the output port 90, where the modulation occurs in response to the input data stream 82.

In one embodiment in operation, the silicon waveguide 54 and the lateral electrodes 66, 70 function as the bottom plate of a parallel plate capacitor while the top electrode 78 functions as the top plate. When the top electrode 78 is charged negatively with respect to the silicon waveguide 54 and the lateral electrodes 66, 70, electrons in n-type silicon are pushed away from the optical mode 64, exposing the mid-bandgap states and dramatically increasing the absorption of the continuous wavelength radiation. In contrast when positively charged with respect to the silicon waveguide 54 and the lateral electrodes 66, 70, the top electrode 78 draws electrons in an n-type silicon waveguide 54 toward the optical mode, filling the mid-bandgap states and dramatically decreasing the absorption of the continuous wavelength radiation. In an alternative embodiment, the semiconducting waveguide electroabsorption modulator is fabricated without the lateral electrodes 66, 70. In this embodiment voltages applied to the top electrode still change the occupancy of the mid-bandgap states and hence the absorption coefficient of the waveguide according to the principles of the invention.

As with the semiconducting waveguide electroabsorption modulator 6, the semiconducting waveguide electroabsorption modulator 50 functions as optical modulator by varying the absorption coefficient of at least a portion of the silicon waveguide 64 in response to the input data stream 82. The intensity of the transmitted optical radiation is affected, or modulated, by the variation in the absorption coefficient. Because intensity changes with absorption coefficient as $I=I_0\exp(-\alpha l)$, where I is an output intensity, $I_0$ is an input intensity, $\alpha$ is the absorption coefficient per unit length, and l is a length, a small change in the absorption coefficient $\alpha$ over a specific (or predetermined) length can strongly change the absorption of electromagnetic illumination, and thereby change the resulting output intensity I. The variation in the absorption coefficient is again achieved by raising or lowering the quasi Femi level either above or below mid-bandgap electronic states. When the states are occupied, the absorption coefficient is low as the Pauli exclusion principle excludes the possibility of electrons transitioning to the mid-bandgap states. However, when a shift in voltage lowers the quasi Fermi level driving electrons out of the mid-bandgap states the absorption coefficient is increased. In this case the photon energy can be absorbed by electrons transitioning to the now vacant mid-bandgap states.

In alternative embodiments, the invention is implemented in p-type silicon, instead of n-type silicon. The operation of an embodiment in p-type silicon is similar to those described above except that that the signs of relative voltages are switched.

As mentioned above, in additional alternative embodiments, amorphous silicon and other semiconducting materials including various crystalline and non-crystalline III-V semiconductor compounds, such as GaAs, GaAs/AlGaAs, InP, and the like can be used to implement a semiconducting waveguide electroabsorption modulator according to the principles of the invention. In these materials the energy of the semiconducting bandgap and possibly the mid-bandgap states will be different. In addition the wavelength for optical radiation transmitted through the modulator can also be different and includes but is not limited to radiation in the bands 1310 nm, 1490 nm, and the range of 1 µm to 30 µm. However, the operation of these embodiments will be in accordance with the same principles of the invention in which an applied voltage is used to change the occupancy of mid-bandgap states and, hence, the absorption coefficient for optical radiation transmitted through the modulator.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, or publication identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the structure and methods disclosed herein and as illustrated in the drawings, it is not confined to the details set forth and this invention is intended to cover any modifications and changes as may come within the scope and spirit of the following claims.

What is claimed is:

1. A semiconductor electroabsorption modulator, comprising:
    a semiconductor wave guide having an input port configured to receive an input optical signal comprising a wavelength and an output port configured to transmit an output optical signal, said semiconductor wave guide having an electronic bandgap and an absorption coefficient for said wavelength, at least a portion of said semiconductor wave guide having at least one deliberately created electronic energy state within said electronic bandgap; and
    at least one pair of electrodes disposed in proximity to at least a portion of said semiconductor wave guide, at least one electrode of said at least one pair of electrodes configured to receive an input data signal,
    wherein in response to an application of said input data signal to said at least one electrode of said at least one pair of electrodes, said semiconductor electroabsorption modulator is configured to provide an output optical signal comprising a modulation component based upon a change in said absorption coefficient of at least a portion of said semiconductor wave guide, said modulation component configured to distinguish a one from a zero in a digital data stream;
    wherein said change in said absorption coefficient of at least a portion of said semiconductor wave guide is responsive to a change in a Fermi level of said semiconductor wave guide, whereby a probability of occupancy of said at least one deliberately created electronic energy state within said electronic bandgap is modified.

2. The semiconductor electroabsorption modulator of claim 1, wherein said at least one deliberately created electronic energy state within said electronic bandgap is due to surface states of said semiconducting wave guide.

3. The semiconductor electroabsorption modulator of claim 1, wherein said at least one deliberately created electronic energy state within said electronic bandgap is due to ion implantation in said semiconductor wave guide.

4. The semiconductor electroabsorption modulator of claim 1, wherein said semiconductor wave guide is implemented in damaged silicon.

5. The semiconductor electroabsorption modulator of claim 1, wherein said semiconductor wave guide is implemented in a silicon-on-insulator configuration.

6. The semiconductor electroabsorption modulator of claim 1, wherein said semiconductor wave guide is implemented in a III-V compound semiconductor.

7. The semiconductor electroabsorption modulator of claim 1, wherein said semiconductor wave guide is implemented in an amorphous semiconductor.

8. The semiconductor electroabsorption modulator of claim 1, wherein said at least one electrode includes at least a top electrode disposed above said semiconductor wave guide, said top electrode separated from said semiconductor wave guide by an insulating layer.

9. The semiconductor electroabsorption modulator of claim 1, wherein said wavelength is a wavelength used in telecommunication.

10. The semiconductor electroabsorption modulator of claim 9, wherein said wavelength used in telecommunication is a wavelength in a selected one of a 1310 nm band, a 1490 nm band, and a 1550 nm band.

11. The semiconductor electroabsorption modulator of claim 1, wherein said wavelength is a wavelength in the range of 1 μm to 30 μm.

12. A semiconductor electroabsorption modulator, comprising:
- a semiconductor wave guide having an input port configured to receive an input optical signal comprising a wavelength and an output port configured to transmit an output optical signal, said semiconductor wave guide having an electronic bandgap separating a valence band and a conduction band and having an absorption coefficient for said wavelength, at least a portion of said semiconductor wave guide having deliberately created electronic energy states within said electronic bandgap, said deliberately created electronic energy states being separated from said valence band and from said conduction band;
- at least one electrode disposed in proximity to at least a portion of said semiconductor wave guide, said at least one electrode configured to receive an input data signal,
- wherein changing a voltage on said at least one electrode in response to said input data signal changes a probability of occupancy of said deliberately created electronic energy states within said electronic bandgap resulting in a change in said absorption coefficient for at least a portion of said semiconductor wave guide and a modulation of said output optical signal in response to said input data signal, said modulation configured to distinguish a one from a zero in a stream of digital data;
- wherein said change in said absorption coefficient of at least a portion of said semiconductor wave guide is responsive to a change in a Fermi level of said semiconductor wave guide, whereby a probability of occupancy of said at least one deliberately created electronic energy state within said electronic bandgap is modified.

13. The semiconductor electroabsorption modulator of claim 12, wherein said deliberately created electronic energy states within said electronic bandgap are due to surface states of said semiconducting wave guide.

14. The semiconductor electroabsorption modulator of claim 12, wherein said deliberately created electronic energy states within said electronic bandgap are due to ion implantation in said semiconductor wave guide.

15. The semiconductor electroabsorption modulator of claim 12, wherein said semiconductor wave guide is implemented in damaged silicon.

16. The semiconductor electroabsorption modulator of claim 12, wherein said semiconductor wave guide is implemented in a silicon-on-insulator configuration.

17. The semiconductor electroabsorption modulator of claim 12, wherein said semiconductor wave guide is implemented in a III-V compound semiconductor.

18. The semiconductor electroabsorption modulator of claim 12, wherein said semiconductor wave guide is implemented in an amorphous semiconductor.

19. The semiconductor electroabsorption modulator of claim 12, wherein said at least one electrode includes at least a top electrode disposed above said semiconductor wave guide, said top electrode separated from said semiconductor wave guide by an insulating layer.

20. The semiconductor electroabsorption modulator of claim 12, wherein said wavelength is a wavelength used in telecommunication.

21. The semiconductor electroabsorption modulator of claim 20, wherein said wavelength used in telecommunication is a wavelength in a selected one of a 1310 nm band, a 1490 nm band, and a 1550 nm band.

22. The semiconductor electroabsorption modulator of claim 12, wherein said wavelength is a wavelength in the range of 1 μm to 30 μm.

23. A method of operating a semiconducting electroabsorption modulator, comprising the steps of:
- providing an input optical signal to an input port of a semiconductor wave guide, said semiconductor wave guide having at least one deliberately created electronic energy state in an electronic bandgap, and having an optical output port configured to provide an output optical signal;
- changing a voltage on an electrode disposed in proximity to said semiconductor wave guide in response to an input data signal, said changing a voltage changing an absorption coefficient of said semiconductor wave guide, and said absorption coefficient is responsive to a change in a Fermi level of said semiconductor wave guide, whereby a probability of occupancy of said at least one deliberately created electronic energy state in said electronic bandgap is modified; and
- transmitting said output optical signal from said optical output port, said output optical signal modulated in response to said input data signal.

\* \* \* \* \*